United States Patent [19]

Leighton et al.

[11] Patent Number: 4,994,189
[45] Date of Patent: Feb. 19, 1991

[54] SEPARATION DEVICE UTILIZING OSCILLATORY LIQUID MEMBRANE

[76] Inventors: David T. Leighton, 60049 Cedar Rd., Mishawaka, Ind. 46544; Mark J. McCready, 54155 E. Lake Dr., South Bend, Ind. 46635

[21] Appl. No.: 252,575

[22] Filed: Sep. 30, 1988

[51] Int. Cl.$^5$ .......................................... B01D 61/38
[52] U.S. Cl. ................................... 210/637; 210/643; 210/321.84
[58] Field of Search ............... 210/643, 644, 649, 637, 210/321.84; 261/122

[56] References Cited

U.S. PATENT DOCUMENTS

| | | | |
|---|---|---|---|
| 3,956,112 | 5/1976 | Lee et al. | 210/644 |
| 4,596,283 | 6/1986 | Ciprios et al. | 261/122 X |
| 4,726,938 | 2/1988 | Rollat et al. | 210/643 X |
| 4,765,904 | 8/1988 | Kaplan | 210/637 |
| 4,770,675 | 9/1988 | Kurzweg et al. | 55/15 |

OTHER PUBLICATIONS

F. J. M. Horn and K. L. Kipp, Jr., *Mass Transport Under Oscillatory Fluid Flow Conditions*, Chemical Engineering Science, 1967, vol. 22, pp. 1879-1880.

R. G. Rice, *Effect of Fluid Oscillations on Mass Transfer in Porous Media with Particular Reference to Fuel Cells*, Fifth Australasian Conference on Hydraulics and Fluid Mechanics at University of Canterbury, Christchurch, New Zealand, Dec. 9-13, 1974.

Richard G. Rice and L. C. Eagleton, *Mass Transfer Produced by Laminar Flow Oscillations*, The Canadian Journal of Chemical Engineering 48, pp. 46-51, Feb. 1970.

Richard G. Rice, *Diffusive Mass Transfer Produced by Laminar Flow Oscillations*, A Dissertation in Chemical Engineering, Presented to the Faculty of the Graduate School of Arts and Sciences of the University of Pennsylvanaia, 1968.

Gary W. Howell, *Separation of Isotopes by Oscillatory Flow*, Phys. Fluids 31 (6), pp. 1803-1805 (Jun. 1988).

U. H. Kurzweg and Ling de Zhao, *Heat Transfer by High-Frequency Oscillations: A New Hydrodynamic Technique For Achieving Large Effective Thermal Conductivities*, Phys. Fluids 27 (11), Nov. 1984, pp. 2624-2627.

*Primary Examiner*—Frank Spear
*Attorney, Agent, or Firm*—Barnes & Thornburg

[57] ABSTRACT

A apparatus and method for separating and purifying chemical species is presented. A supported liquid membrane is oscillated at frequencies sufficient to enhance the molecular diffusion of solute species across the supported liquid membrane.

12 Claims, 3 Drawing Sheets

SEPARATION DEVICE UTILIZING OSCILLATORY LIQUID MEMBRANE

BACKGROUND OF THE INVENTION

The present invention relates to a device useful for separating or purifying chemical species in solution based on their relative rates of diffusion. More particularly this invention is directed to an apparatus and method for separation of solute species by their selectively enhanced diffusion through an oscillated liquid membrane.

The use of liquid membranes and the selected diffusion of substrates through liquid membranes have been the focus of significant research and development efforts in the art. Much work has been reported particularly with respect to the use of unsupported liquid membranes in the form of minute surfactant stabilized globules. Other liquid membrane structures known in the art are so-called supported liquid membranes wherein a liquid phase is contained within the confines of a porous support structure, for example by surface tension phenomena. The porous support structure is typically one which exhibits high affinity for the contained membrane-forming liquid. It is known also that the membrane-forming liquid can be modified to contain chemically reactive species or species which otherwise interact with solute species to promote or decrease the rate of diffusion of said species through the liquid membrane structure.

Industrial use of liquid membranes have been limited by problems associated with translating laboratory successes into industrial scale devices. Because of costs and difficulties associated with the creation and breaking down of stable emulsions, liquid surfactant membrane separation techniques provide an attractive alternative to traditional separation processes only when the target species must be extracted to very low concentration levels, for example, where metal ions or hazardous organic compounds are to be removed from water for discharge into the environment. Supported liquid membranes avoid many of the problems associated with emulsion technology, but they suffer from other practical problems such as limited surface area, solvent stability within the membrane structure and low solute species molecular diffusion rates.

The present invention makes use of supported liquid membrane structures in a device for purification or separation of selected solute species. However, the present device overcomes the problem associated with low diffusivity and concomitant poor membrane transport rates by oscillation of the supported liquid membrane. The present method and device embodying that method enables an enhanced mass transport of selected solute species across a supported liquid membrane. Applicant's discovery of oscillation enhanced membrane diffusion allows practical use of supported liquid membranes in separation/purification processes for a wide range of preparative and industrial applications.

Several investigators have published works dealing with the dynamics of single phase fluid flow through cylindrical tubes. Aris (*Proc. Roy. Sec. A.* 259, p. 370, 1960) discussed dispersion of a solute in pulsating fluid flow through a tube. Aris reported that the calculated diffusion constant for a viscous fluid can be proportional to the square of the amplitude of the pressure pulsations. For a viscous flow under a pulsating pressure gradient, the effective dispersion coefficient of a solute can be markedly enhanced. A similar theoretical analysis of this phenomenon has also been reported by Watson (*J. Fluid. Mech..* 133, 233, 1983).

Experiments demonstrating an increase in molecular diffusivity in a gas filled cylindrical tube have been conducted by Joshi et al. (*J. Fluid. Mech.*, 133, 245, 1983). Joshi found the increase in effective molecular diffusivity for axial transport of a contaminant gas subjected to oscillatory flow in a tube to be in agreement with the theoretical predictions of Watson. The experiment conducted by Joshi et al. measured methane transport through a gas filled tube. Experiments by Kurzweg and Howell (*Phys. Fluids* Vol. 27, No. 5, pp. 1046–48) have also indicated enhanced molecular gas dispersion coefficients for tubes of varying radii. Isotopic separation by differentially enhanced molecular diffusion of gaseous isotopes in a carrier gas has been reported by Howell (*Phys. Fluids,* 31 (6) 1988).

SUMMARY OF THE INVENTION

The present invention is directed to an apparatus and method for purification/separation of a solute species by selectively enhancing the molecular diffusion of one or more solute species through a supported liquid membrane. The apparatus includes two chambers for fluid containment, a supported liquid membrane typically forming at least a portion of a wall common to said chambers and a means for oscillating the membrane-forming liquid. A concentration gradient of at least one solute species is established between one fluid solution contained in the first chamber and a second fluid solution contained in the second chamber. The rate of diffusion of said solute species across the liquid membrane has been found to be a function of the frequency of oscillation of the liquid membrane and accordingly can be selectively controlled.

The supported liquid membrane consists essentially of a porous support supporting a liquid substantially immiscible with both fluid solutions in the first and second chamber. The porous support can be any structure having a communicating porous structure, such as bundled capillary tubes, glass frits, or packed beads rigidly held in place. The liquid may carry reactive species, catalytic agents, or other agents able to modify or bind solute species diffusing through the liquid membrane.

Inducing oscillatory liquid flow in the supported liquid membrane has the effect of enhancing molecular diffusivity. The frequency of oscillatory liquid flow can be chosen to enhance the molecular diffusivity of selected solute species in the first fluid through the supported liquid membrane and into the second fluid.

DETAILED DESCRIPTION OF THE SPECIFIC EMBODIMENTS

In accordance with the subject invention, a novel apparatus and method is presented for purification and separation of solute species. It has been observed that many potentially useful laboratory and industrial separation and purification processes involving transfer across a supported liquid membrane are not utilized because of the low mass transfer rate of solute species across a supported liquid membrane. The subject invention provides a means for enhancing mass transfer of a solute in one fluid contacting a supported liquid membrane across the supported liquid membrane and into a second fluid communicating with the liquid membrane. The liquid in the supported liquid membrane is induced to oscillate relative to the supporting structure at a frequency sufficient to selectively enhance molecular diffusion of solutes across the supported liquid membrane. The amplitude and frequency of the liquid oscillation is controlled so as not to cause substantial separation of the membrane-forming liquid from the support structure and thereby maintain membrane integrity during operation.

Those skilled in the art will appreciate that there exists a variety of means for accomplishing liquid membrane oscillation. For example, a pressure gradient can be established across the liquid membrane by mechanical oscillation of the liquid membrane support structure itself. Alternatively, inducing flow in a supported liquid ferrofluid could be achieved by means of an alternately reversing electromagnetic field. In the preferred embodiment of this invention oscillation of the liquid in the supported liquid membrane is accomplished by successive compression and rarefaction of a contained fluid in fluid communication with supported liquid membrane. In a most preferred embodiment an oscillating piston alternately decreases and increases the volume in a closed chamber, causing successive compression and rarefaction of the fluid in the chamber. Oscillatory motion is thereby induced in the supported liquid membrane which forms at least part of one wall of the closed chamber.

Inducing liquid oscillations in a supported liquid membrane has the effect of greatly increasing the mass transfer rate of selected solute species across the membrane. Typical experimental values for even crude systems indicate a 30-fold increase in mass transfer rates for an oscillated supported liquid membrane as compared to its non-oscillated counterpart. This change in the characteristic mass transfer rate can be quantified as either an increase in the diffusion rate coefficient of the solute species, or as a decrease in the apparent supported liquid membrane thickness.

The mechanism of the enhanced mass transfer phenomenon forming the basis of the present invention is explained as follows: When a small quantity of a contaminating substance is introduced into fluid flowing in a porous support, the diffusive spread is enhanced by the flow of the fluid. This effect is a result of the variation in velocity of flow in a pore, which allows transverse diffusion to be effective in dispersing the contaminant. Similar enhancements in diffusion rate occur when the flow is oscillatory.

In oscillatory flow the degree of enhancement of molecular diffusivity is proportional to the square of the dimensionless tidal displacement ($\Delta x/a$), where a is the pore radius and $\Delta x$ is the tidal displacement along the axial length of the pore. The tidal displacement resulting from an oscillatory pressure gradient across the length of the pore can be determined from Poiseuille's Law to scale proportional to $a^2$. As a consequence, the contribution of each size of pore will also scale as $(\Delta x/a)^2 \sim (a^2/a)^2 \sim a^2$ times the area occupied by pores of that size.

The degree of enhancement of molecular diffusivity is a monotonically increasing function of the frequency of the oscillation. We may define a dimensionless frequency $\beta$ as:

$$\beta = (2\pi f a^2/D)^{\frac{1}{2}} \qquad \text{(Eq. 1)}$$

Where f is the frequency of oscillation, a is the pore diameter, D is the molecular diffusivity, and $\beta$ is the dimensionless frequency of oscillation.

Figure 5:
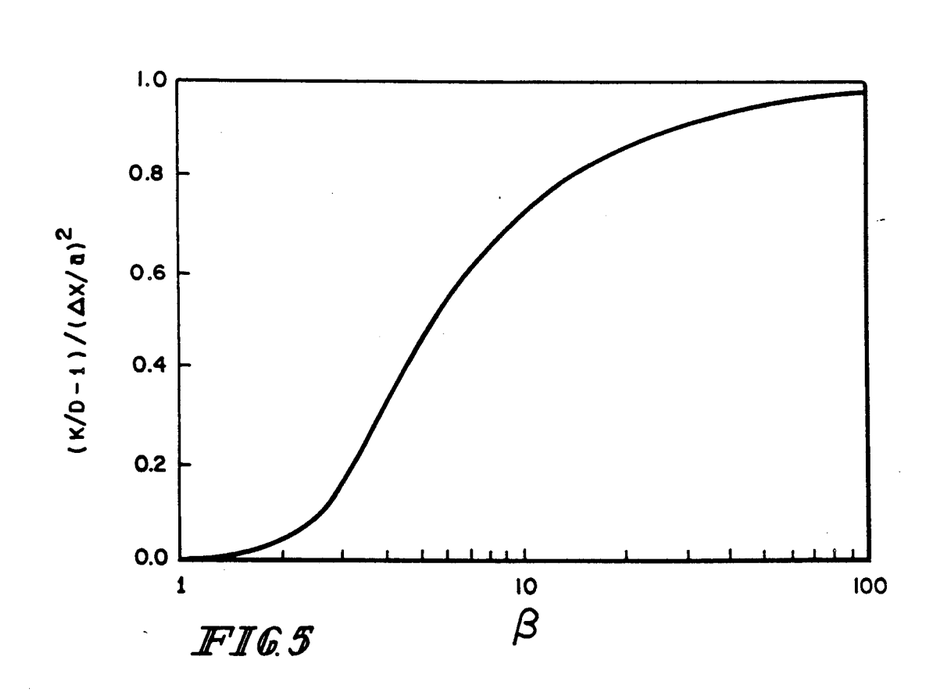
FIG. 5 is a graph showing degree of molecular diffusivity enhancement as a function of $\beta$.

The degree of augmentation shown approaches a maximum for large $\beta$ and vanishes rapidly for small $\beta$. This is graphically demonstrated in FIG. 5, which shows the degree of enhancement in molecular diffusivity as a function of $\beta$.

For a fixed frequency and pore radius the degree of enhancement is a function of molecular diffusivity, with the molecular diffusivity enhancement being augmented to a greater degree for those molecules having a low diffusivity. Molecules having a high diffusivity, for which $\beta$ is much less than 1, receive essentially no augmentation in molecular diffusivity since they diffuse across the width of the pores of the supported membrane during a time which is much shorter than the period of oscillation, and thus simply move back and forth in the tube with the average velocity of the fluid. This phenomenon provides the basis for the present supported liquid membrane separation processes.

Figure 6:
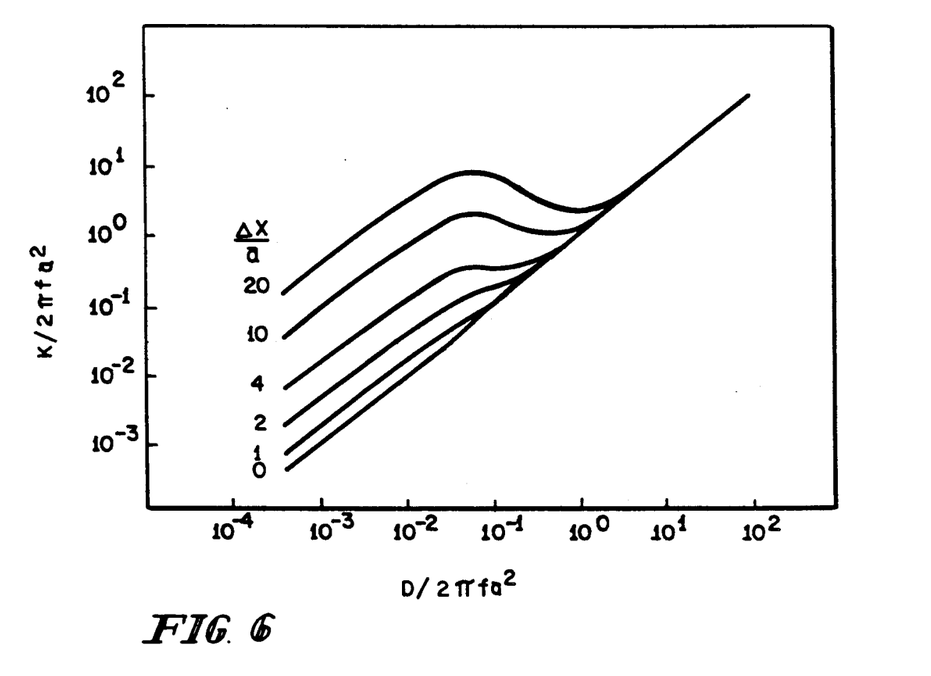
FIG. 6 is a graph of the effective molecular diffusivity vs. molecular diffusivity.

As shown in FIG. 6, a surprising result occurs in the family of curves exhibiting a maximal tidal displacement ($\Delta x/a$) greater than about 4. Because the molecular diffusivity enhancement curves are non-linear, it is possible to cause a large, low diffusivity molecule to travel across a supported liquid membrane faster than a smaller, high diffusivity molecule. For example, if the tidal displacement ($\Delta x/a$) is 10, a solute species with a dimensionless molecular diffusivity of $10^{-1}$ will experience an enhanced molecular diffusivity of 2, while a molecule having a molecular diffusivity 10 times greater will experience no enhancement in molecular diffusivity. The net result will be that the larger molecule will have a higher enhanced molecular diffusivity by a factor of 2. Within the physical limits imposed by the need to maintain the integrity of the support structure and prevent separation of the membrane-forming liquid from that structure, the degree of differential enhancement can be further increased by increases in the tidal displacement ($\Delta x/a$).

Additionally, varying the dimensionless frequency $\beta$ through modification of the frequency of oscillation or the pore radius allows the selection of the maximum enhanced diffusivity at any desired value of molecular diffusivity. The frequency of oscillation can be adjusted to cause enhancement of molecular diffusivity of large molecular complexes without significant increase in the molecular diffusivity of the solvent. This permits the use of facilitated transport systems in which solutes bind with carrier species, greatly increasing the concentration of the solute. This can greatly increase the selectivity of supported liquid membranes.

The porous support can be any structure capable of supporting a liquid and having pores through which liquid communication across the supported liquid membrane is possible. Additionally, the porous support must be substantially rigid relative to the membrane liquid and able to maintain its physical integrity during oscillation. The rigidity of the structure is necessary to produce liquid flow within the supported liquid membrane. Within these contraints there exist a variety of supports suitable for the present invention. Preferred embodiments include but are not limited to, bundled capillary tubes, beads rigidly maintained in association with each other, microporous polypropylene films, glass frits and stainless steel screening. Both layered support systems and three dimensional porous structures are suitable for the purposes of this invention. In a most preferred embodiment of this invention the membrane-forming liquid is supported by a glass frit.

Various pore sizes are also suitable for this invention. A uniform pore size is not necessary, but since the molecular diffusion enhancement is dependent on the square of the radius of the pores, in practice molecular diffusion enhancement through the largest pores will dominate diffusion through smaller pores. The pore radius and the pore tortuosity through the porous structure may vary without appreciably affecting the purposes of the invention.

A typical porous support structure should be capable of withstanding a tidal oscillation ($\Delta x/a$) on the order of 10. To ensure membrane stability, the axial dimension of the pores of the membrane should be much greater than $\Delta x$, also on the order of 10 or more. A glass frit having a pore radius of about 10 micrometers, and a porous support thickness of about 1 millimeter would be satisfactory.

The membrane-forming liquid is selected from liquids which exhibit good affinity for the porous support (i e., can wet the surface and exhibit capillarity in the porous support) and which are not miscible with the fluids used in the chambers of the apparatus. It is, of course, critical that the surface of the porous support not be preferentially wetted by a chamber contained fluid vs. the membrane-forming liquid.

The porous support can be treated so that it is preferentially wettable by the desired membrane-forming liquid. This prevents the displacement of the desired membrane liquid by the fluids normally contacting either side of the supported liquid membrane. The membrane liquid retentiveness characteristics of the porous support under conditions oscillatory pressure changes is also enhanced by treatment of the porous support. A most preferred embodiment essentially consists of treating the porous support with a hydrophobic compound, permitting the use of an hydrophobic membrane-forming liquid.

The porous support can also be treated with a variety of immobilized molecular species to act as binding or absorptive agents, chemically reactive agents, or catalytic agents. The appropriate immobilized agents for modification of solute species diffusing across the oscillating supported liquid membrane will be apparent to those skilled in the art. For example, chelators covalently bound to the porous support system would improve the metal leaching characteristics of the supported liquid membrane. Alternatively, a platinum coating could act as a catalytic reactive site for various solute species In many applications, the reactive species need not be bound to the support, but can also exist in solution in the membrane-forming liquid. If the porous support structure is three dimensional, the liquid solution could be continuously recharged with new reactive species to prevent exhaustion of the reactive liquid solution. The particular reactive species used will depend upon the desired modification to the solute species.

Figure 1:
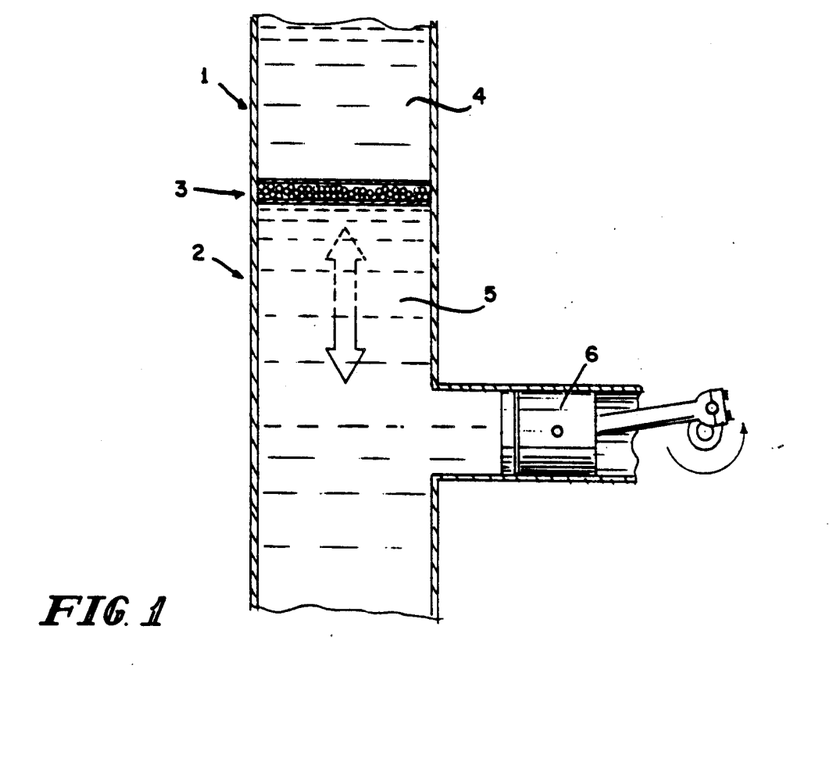
FIG. 1 is a cross sectional view of an oscillatory supported liquid membrane purification or separation device.

A detailed description of an embodiment of the subject invention can be described with reference to FIG. 1.

The apparatus has chamber 2 with contained fluid 5. Chamber 2 is separated from chamber 1, with contained fluid 4, by a supported liquid membrane 3. In operation, piston 6 oscillates at a selected frequency, causing successive compression and rarefaction of fluid 5. This successive compression and rarefaction of fluid 5 induces a corresponding oscillation of the supported liquid membrane 3, thereby enhancing molecular diffusion of solute species across supported liquid membrane 3.

EXAMPLE 1

Materials:

The apparatus used in the oscillatory liquid membrane experiments consisted essentially of an oscillating piston-in-cylinder (syringe) pump coupled to the lower of two chambers separated by a supported liquid membrane. The supported liquid membrane itself consisted of a coarse glass frit impregnated with Exxon S100N dewaxed Solvent 100 Neutral isoparaffinic solvent. The membrane support had an area of 2.84 cm$^2$ and was 3 mm thick.

The transport of phenol across the membrane was evaluated. Phenol has a reported diffusivity of $0.65 \times 10^6$ cm$^2$/s in the oil phase and a partition coefficient of 0.52 between the aqueous and oil phases. The lower chamber was filled with a 1% solution of phenol and the upper chamber was filled with distilled water. Agitation in the two chambers was provided by means of magnetic marbles which could be moved up and down. The volumes of the chambers, accounting for that taken up by the marbles, were 5.35 ml.

Procedure:

Prior to impregnating the glass frit with the oil membrane phase, the frit was rendered hydrophobic by spraying it with Scotchguard ®. This material was a solution of a fluoraliphatic resin in 1,1,1-trichloroethane driven by a propellent. The material was sprayed onto the surface of the frit and then drawn through by vacuum. If the frit were not rendered hydrophobic, then the oil membrane phase would be displaced from the frit by water upon contact. Impregnation with the oil phase was accomplished by drawing the oil through the glass frit with vacuum. Excess oil was poured off.

The device was assembled and inverted, and the lower chamber was filled with the phenol solution. Green dye was added to the solution to reveal the presence of any defects in the membrane during operation. Care was taken to eliminate all air from the lower chamber to ensure that any displacement of the syringe would result in displacement of the fluid in the membrane. The device was then brought upright and the upper chamber was filled with distilled water. Samples of the fluid in the upper chamber, 0.5 µl in size, were analyzed for phenol concentration using a gas chromatograph. The instrument was calibrated with measurements of the phenol concentration used in the lower chamber, minimizing possible sources of error. Concentration measurements in the upper chamber were taken periodically throughout each experiment to determine the rate of change of the concentration. Stroke volumes of 18 μl and 36 μl were used. However since the membrane ruptured at the larger stroke volume, the results presented here are confined to the lower stroke volume. Frequencies examined ranged from 0.099 Hz to 1.03 Hz.

Figure 2:
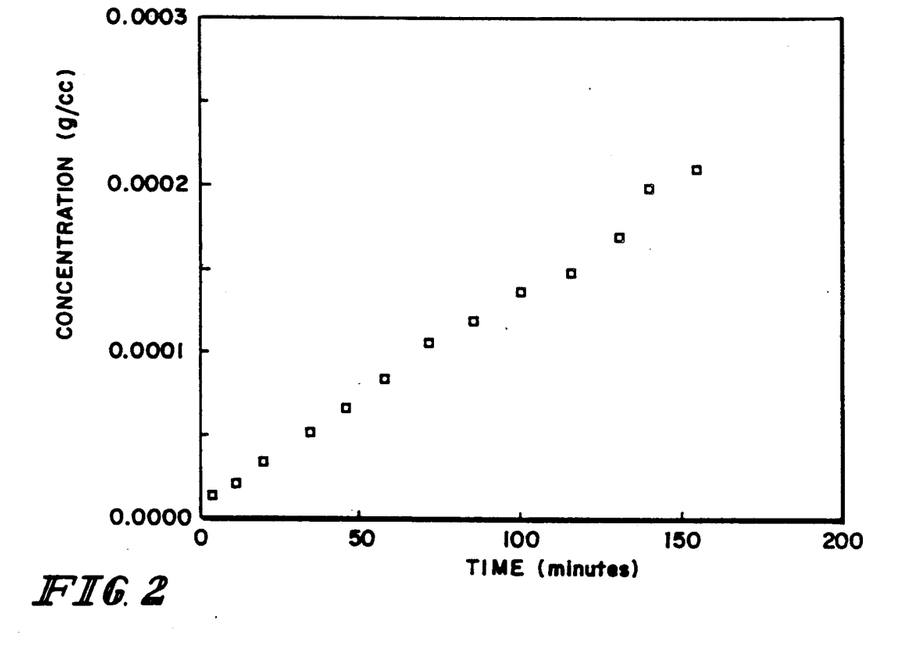
FIG. 2 is a graph showing a typical concentration increase with time for diffusion of phenol across an oscillatory supported liquid membrane.

Results:

The diffusion across the membrane both with and without the oscillation was found to provide a linear increase in phenol concentration with time on the collection side. Typical results for concentration measurements are depicted in FIG. 2. The experiment was conducted at each frequency for a sufficiently long period of time (2-8 hours) that a reliable rate of increase could be measured. At the 18 μl stroke volume ΔV, the membrane was stable.

Figure 4:
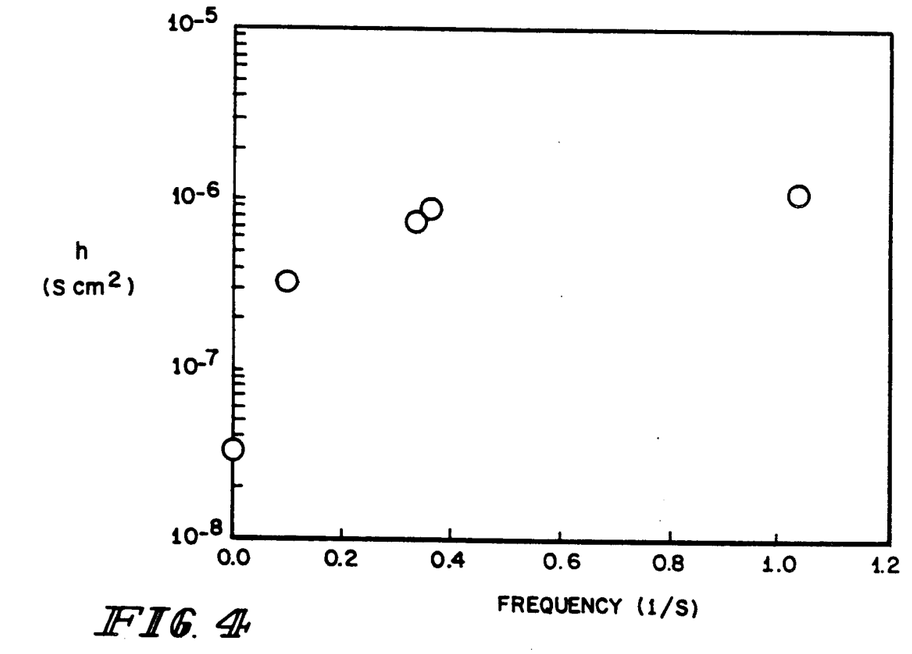
FIG. 4 is a graph showing mass transport coefficients measured as a function of oscillatory frequency of the supported liquid membrane.

The enhancement in the transport rate across the membrane due to oscillation was substantial (a factor of 30 at the highest frequency studied), and was an increasing function of frequency. FIG. 4 provides the observed mass transfer coefficients for the membrane. The degree of enhancement was also found to be reproducible, with the mass transfer coefficients from two separate impregnations lying within 15% of each other at the same frequency.

Figure 3:
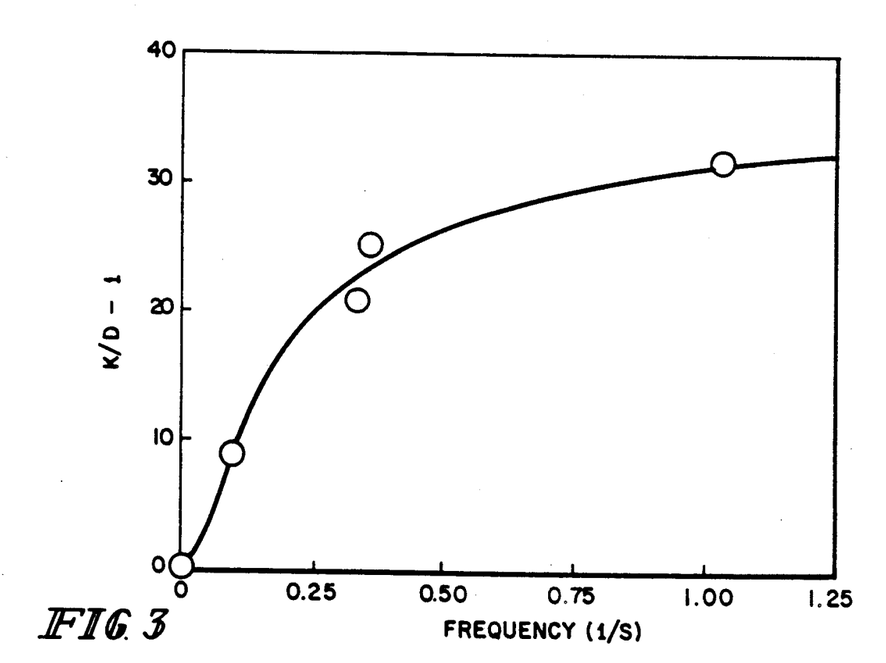
FIG. 3 is a graph showing the observed enhanced diffusion rates as a function of frequency, compared to the line indicating the predicted enhanced diffusion rates.

The predicted enhanced molecular diffusity as a function oscillation frequency is shown in FIG. 3 (solid line). Again, the observed molecular diffusivity enhancement is also displayed (circles).

EXAMPLE 2

Waste Water Treatment:

It is often necessary to treat effluent from chemical plants to remove large quantities of toxic materials before discharging the effluent stream into conventional waste treatment facilities. In this example we consider the performance of a model oscillatory membrane for the recovery of phenol from a waste stream. For design purposes, consider a plant which discharges a 10% phenol solution at a rate of 1000 liters/hr. To recycle this phenol and to reduce its concentration to the point where conventional biological digestion of the phenol can occur, it is necessary to remove 99% of the phenol via a supported oscillatory liquid membrane process.

Procedure

In this case, the phenol is diffused across a liquid membrane from the waste stream into a collection phase containing concentrated NaOH. This basic solution reacts with the phenol and acts to reduce the phenol concentration on the collection side to zero. The liquid membrane support is 1 mm thick with a porosity $\epsilon = 0.5$ and a characteristic pore radius of 10 μm. The liquid supported by the membrane is light oil Exxon S100N with a viscosity of 44 cp. The diffusivity of phenol in this oil is $0.65 \times 10^{-6}$ cm$^2$/s, and the oil/water partition coefficient is 0.52. To insure that only a small fraction of the membrane fluid is displaced during operation, a tidal displacement of $\Delta x/L = 0.1$, or a 100 μm tidal displacement is selected. At an oscillation frequency of 10 Hz (angular frequency of 61.4 radians/sec) augmentation in transport of a factor of 70 is achieved, corresponding to an effective membrane thickness of 14 μm. The maximum pressure drop required to drive this flow is $1.1 \times 10^4$ Pa, which is comparable to the capillary pressure of the oil/water interface for this pore size. Additionally, the membrane can be rendered stable relative to this pressure differential without affecting the degree of enhancement by incorporating a thin layer of much smaller pore diameter in the interior of the support.

The total transport rate of phenol achieved by this oscillatory membrane is given by:

$$N_{phenol} = K D \epsilon \Delta c / L_{eff}$$

where K is the oil/water partition coefficient, D is the molecular diffusivity, $L_{eff}$ is the effective pore length (the actual pore length divided by the degree of augmentation), $\epsilon$ is the porosity, and $\Delta c$ is the concentration differential of phenol across the membrane. The total area of membrane required to remove 99% of the phenol from a waste stream with flow rate $Q = 1000$ l/hr is given by:

$$Area \times (\log(100) L_{eff} / K D \epsilon) Q = 960 \ m^2$$

Note that while the membrane area may seem high, it is of moderate size by process equipment standards. The liquid membrane requires only about 400 kg of the light oil in total, as compared with a phenol recovery of nearly 100 kg/hr.

EXAMPLE 3

Concentration of an Amino Acid

Amino acids are often used directly in various nutritional supplements as well for reactants in the manufacture of other synthetic chemicals. A desirable method of synthesis of amino acids is through biochemical means because certain bacteria can be genetically altered to produce the correct isomer as their sole product. (Chemical synthesis methods usually produce a racemic mixture.) The greatest difficulty which arises when amino acids are produced by living organisms is the recovery of the product from the fermentation broth in a sufficiently concentrated form for further processing. This concentration step can be done using the present oscillatory liquid membrane process.

Procedure

A carrier-facilitated counter-transport process, such as has been suggested for emulsified surfactant liquid membranes, is used. In this process chloride (Cl$^-$) will be transported down its concentration gradient, driving the transport of an amino acid (phenylalanine in this example) in the opposite direction. If the gradient of Cl$^-$ is larger than the corresponding gradient in phenylalanine, the phenylalanine can, in theory, actually be transported against its concentration gradient and thereby obtained at a higher concentration. The carrier needed for this counter transport process is a quaternary ammonium salt (tricaprylylmethylammonium chloride). The chloride ions may be obtained from a 2M aqueous potassium chloride solution on the collection side of the liquid membrane, and into which the phenylalanine is to be concentrated. For design purposes, consider the extraction of amino acid from 1000 liters of a fermentation broth which contains 1.7% phenylalanine by weight. A liquid membrane support 1 mm thick with a porosity $\epsilon = 0.5$ and a characteristic pore radius of 10 μm is selected. The liquid membrane support is filled with Exxon S100N oil with a carrier concentration of 10$^{-2}$M. The diffusivity of the amino acid-ammonium salt complex concentration across the membrane will be approximately half the carrier concentration since all of the salt will be complexed with either the amino acid or chloride ion. To insure that only a small fraction of the membrane fluid is displaced during operation, the membrane is operated with a 100 μm tidal displacement. At an oscillation frequency of 5.5 Hz (angular frequency of 34 radians/sec) an augmentation in transport of a factor of 70 is achieved, yielding an effective membrane thickness of 14 μm. The maximum pressure drop required to drive this flow is $5. \times 10^3$ Pa. Approximately 95% of the phenylalanine can be extracted from a batch of 1000 liters in a device with an area of about 7700 m$^2$ in a period of 1 hour. A smaller separation device with a lower phenylalanine flux can be used. Alternatively, several reactors could be used to feed the one oscillatory liquid membrane separator.

The use of an oscillatory liquid membrane system can reduce a problem which has arisen in the use of emulsion liquid membranes for concentrating phenylalanine. In standard liquid membrane systems, water will diffuse due to the gradient in salt concentration, and is transferred across the membrane at a rate sufficient to dilute the product even though it has a very low solubility in the oil. This occurs due to the high diffusivity of the water molecules, which is about $2 \times 10^{-6}$ cm$^2$/sec, or an order of magnitude greater than the phenylalanine-ammonium salt complex. In an oscillatory liquid membrane, however, the degree of enhancement of the transport rate is a function of the dimensionless frequency $\beta = (2\pi f a^2/D)^{\frac{1}{2}}$ where f is the frequency of oscillation, a is the pore radius and D is the molecular diffusivity, and hence the enhancement will be different for different species. In this case the diffusivity of water is augmented by only a factor of about 13, resulting in an effective membrane thickness for water of 77 μm. The oscillation of the fluid in the membrane thus not only increases the transport rate of phenylalanine by a factor of 70, but also increases its selectivity by a factor of 5.5 and making it possible to actually concentrate the amino acid.

EXAMPLE 4

Recovery of a Toxic Metal from an Aqueous Solution

Plating operations often produce wastewater streams which contain toxic heavy metal ions, such as $Cr^{6+}$. It is not safe to discharge these streams into the environment. In addition, it is desirable to recover the metal ion in a form suitable for re-use. Emulsion liquid membranes have been proposed for this purpose and a plant utilizing that technology is now in operation in Australia. The present oscillatory liquid membrane process can be used here as well.

Procedure

A carrier facilitated transport system is used. In this case an appropriate carrier is Alamine, a $C_8$-$C_{10}$ tertiary amine. The pH of the wastewater phase is adjusted to 3.5. The other phase will be basic, a 10% NaOH solution which will regenerate the amine. Until the OH$^-$ ions are depleted, the chromium ions are effectively "trapped" in the second phase because they cannot compete successfully with OH$^-$ for amine which would allow them to reenter the membrane. The membrane support is 1 mm thick with a porosity $\epsilon = 0.5$ and a characteristic pore radius of 10 μm. Exxon S100N with 10% by weight of the carrier added is the working fluid. The diffusivity of the chromium-amine complex in this oil is expected to be about $0.4 \times 10^{-6}$ cm$^2$/s. The concentration change of the chromium-amine complex across the membrane can be taken as $\frac{1}{2}$ the carrier molar concentration. To insure that only a small fraction of the membrane fluid is displaced during operation, a tidal displacement of $\Delta x/L = 0.1$, equivalent to 100 μm tidal displacement is selected. At an oscillation frequency of 7.5 Hz (angular frequency of 46.4 radians/sec) an augmentation in transport of a factor of 70 should be achieved, yielding an effective membrane thickness of 14 μm. The maximum pressure drop required to drive this flow is $7.0 \times 10^3$ Pa. Removal of 95% of the chromium from 1000 liters/hour of a 400 PPM $Cr^{6+}$ stream in water is accomplished with effective membrane area of about 50 m$^2$.

EXAMPLE 5

Separation of Gases

In many important industrial processes it is necessary or desirable to separate gases. Examples of this include the removal of hydrogen sulfide from coal gases in alternative energy systems and the production of oxygen enriched air for breathing assistance apparatus. Supported liquid membranes have been suggested as a means of achieving these separations. The separation of nitric oxide from argon is here considered using an oscillating liquid membrane composed of a ferrous chloride solution in formamide. A high flux of nitric oxide is achieved in this system because NO reversibly reacts with the $Fe^{2+}$ ion, greatly increasing its solubility in the formamide. This is another example of facilitated transport in liquid membranes.

Procedure

A 50% mole fraction mixture of nitric oxide and argon at 2 atm are separated from a collection phase (in which the nitric oxide undergoes an irreversible reaction, reducing its concentration to zero) by a 1 mm thick porous support containing a 0.05M ferrous chloride solution in formamide. This liquid membrane phase has a viscosity of 3.3 cp at 25° C., and the $FeNO^{2+}$ and $FeNO^{2+}$ ions both have a diffusivity of approximately $2 \times 10^{-6}$ cm$^2$/sec. The solubility of the nitric oxide in the formamide solution is $2.62 \times 10^{-3}$ moles/liter for a nitric oxide partial pressure of 1.0 atm. Using a pore radius of 10 μm and tidal volume of 100 μm, and an oscillation frequency of 31 Hz (requiring a maximum pressure drop of only $2.6 \times 10^3$ Pa, much less than the capillary pressure), an enhancement factor of 70 is achieved, corresponding to an effective membrane thickness of 14 μm. In this case the flux of NO across the membrane is given by:

$$N_{NO} = (K D \, \epsilon \Delta c / L_{eff}) = 1.9 \times 10^{-9} \text{ moles/(sec cm}^2\text{)}$$

provided that the transport process is diffusion limited (as is true in this case), and which is considerably greater than that reported in the literature using a much thinner 103 μm $FeCl_2$/formamide liquid membrane with no oscillations.

Although the foregoing invention has been described in some detail by way of illustration and example for purposes of clarity of understanding, it will be obvious that certain changes and modifications may be practiced within the scope of the appended claims.

What is claimed is:

1. An apparatus for separation of a solute species in a first fluid by selective enhancement of molecular diffusion of said solute species through a supported liquid membrane and into a second fluid, said apparatus comprising:

first and second chambers adapted to contain the first fluid and second fluid;

a supported liquid membrane positioned for fluid communication with fluids contained in said first and second chambers, said liquid membrane comprising a porous support and a liquid in the pores of said support, said liquid being substantially immiscible with the first fluid and the second fluid; and means for inducing oscillatory flow of the liquid in the porous support wherein the frequency of oscillatory liquid flow is adjustable to a value selected to enhance the rate of transport of at least one solute species in the first fluid through the supported liquid membrane and into the second fluid relative to that of other solute species in the fluid.

2. The apparatus of claim 1 wherein the first and second chambers are adapted to contain gases.

3. The apparatus of claim 1 wherein the first and second chambers are adapted to contain liquids.

4. The apparatus of claim 1 wherein the first chamber is adapted to contain a gas and the second chamber is adapted to contain a liquid.

5. The apparatus of claim 1 wherein the first chamber is adapted to contain a liquid and the second chamber is adapted to contain a gas.

6. The apparatus of claim 1 wherein the first and second chambers are adapted to contain aqueous solutions.

7. The apparatus of claim 1 wherein the porous support consists essentially of a glass frit.

8. The apparatus of claim 1 wherein the porous support is adapted to be preferentially wetted by the membrane-forming liquid.

9. The apparatus of claim 1 wherein the liquid supported in the porous support and forming the supported liquid membrane contains molecular species capable of interacting with the solute species diffusing through the supported liquid membrane.

10. The apparatus of claim 1 wherein the porous support has immobilized molecular species capable of interacting with solute species diffusing through the supported liquid membrane.

11. An apparatus for purification or separation of a solute species by selective enhancement of molecular diffusion of said solute species through a supported liquid membrane said apparatus comprising:

first and second chambers adapted to respectively contain first and second aqueous liquids;

a supported liquid membrane in fluid communication with said first and second chambers, said liquid membrane comprising a porous support adapted to be preferentially wetted by a hydrophobic liquid, said liquid being substantially immiscible with the first aqueous solution and the second aqueous liquid;

means for inducing oscillatory flow of the hydrophobic liquid in the porous support through the establishment of a time periodic pressure gradient in the aqueous solution contained in one of the first and second chambers wherein the frequency of oscillatory flow is adjustable to a value selected to enhance the rate of transport of at least one solute species in the first aqueous solution through the supported liquid membrane and into the second aqueous solution relative to that of other solute species in the first fluid.

12. A method for separation of a selected solute species from other solute species comprising the steps of:

forming a supported liquid membrane in fluid contact with and separating a first fluid and a second fluid, said supported liquid membrane comprising a porous support and a liquid substantially immiscible with said first and second fluids;

establishing a concentration gradient for the solute species between the first fluid and the second fluid;

inducing a liquid oscillation in the supported liquid membrane, said oscillation frequency being selected to enhance the rate of transport of the selected molecular species through the supported liquid membrane and into the second fluid relative to the rate of transport of the solute species in the first fluid.

* * * * *

UNITED STATES PATENT AND TRADEMARK OFFICE
CERTIFICATE OF CORRECTION

PATENT NO. : 4,994,189

DATED : February 19, 1991

INVENTOR(S) : Leighton et al.

It is certified that error appears in the above-identified patent and that said Letters Patent is hereby corrected as shown below:

In column 8, line 19, please replace "Area x" with --Area =--.

In column 11, line 16, please replace "fluid" with --first fluid--.

Signed and Sealed this

Twenty-third Day of June, 1992

Attest:

DOUGLAS B. COMER

*Attesting Officer*      *Acting Commissioner of Patents and Trademarks*